R. F. COCHRAN.
Improvement in Mechanical Movement.
No. 124,036.                               Patented Feb. 27, 1872.
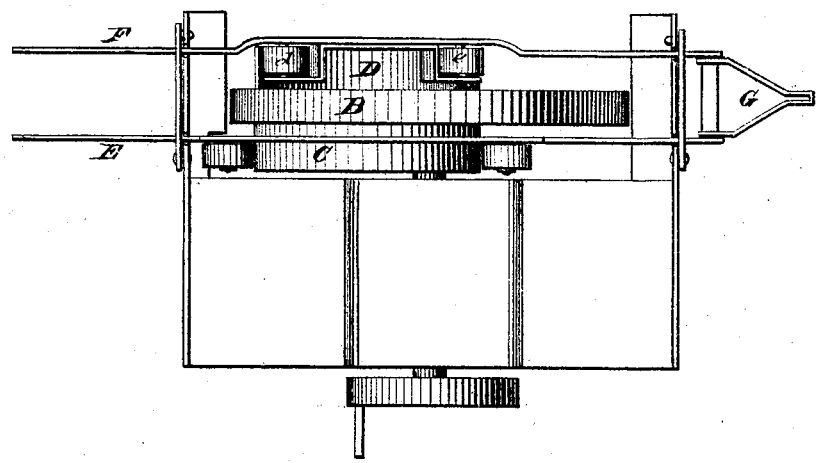
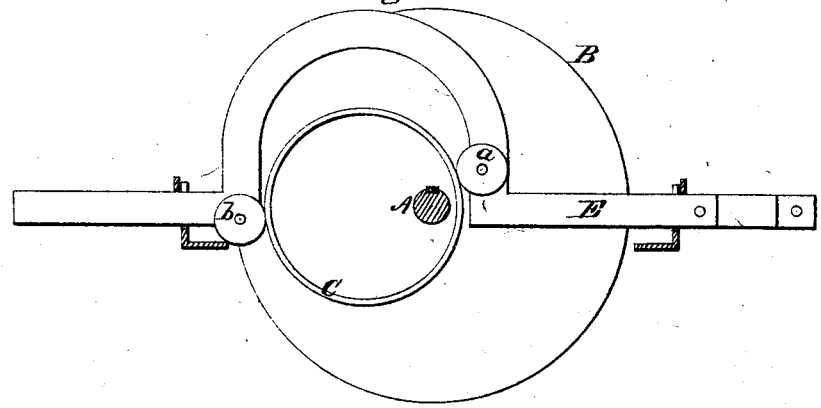
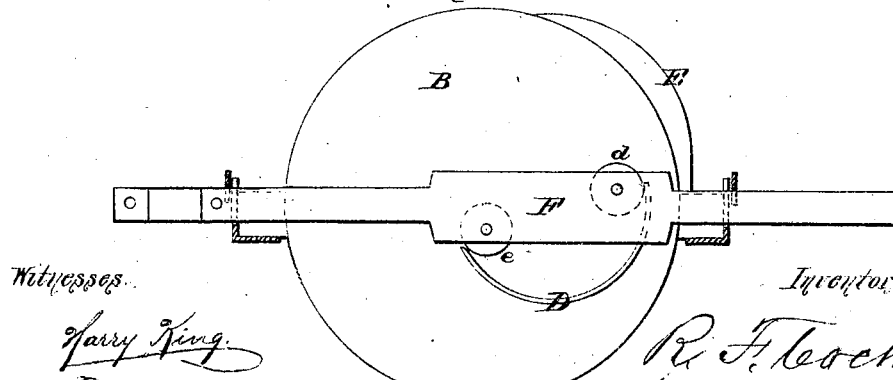

124,036

UNITED STATES PATENT OFFICE.

REUBEN F. COCHRAN, OF BARRY, MARYLAND.

IMPROVEMENT IN MECHANICAL MOVEMENTS.

Specification forming part of Letters Patent No. 124,036, dated February 27, 1872.

SPECIFICATION.

*To all whom it may concern:*

Be it known that I, REUBEN F. COCHRAN, of Barry, in the county of Frederick and State of Maryland, have invented certain Improvements in Mechanical Movements, of which the following is a specification, reference being had to the accompanying drawing.

My invention relates to a contrivance intended as a substitute for the ordinary crank and pitman, for converting a rotary into a reciprocating motion; and the object of the invention is to give the reciprocating slide a uniform speed and force throughout its entire movement, which cannot be done by the crank and pitman.

Figure 1 is a top-plan view of my device. Fig. 2 is an inside-face view of the same; and Fig. 3 an outside-face view.

In constructing my device I mount in suitable bearings, a horizontal shaft, A, and on its end secure a disk, B, made of sufficient weight to serve as a fly-wheel. Against the inner face or side of the disk I secure a circular flange or hub, C, eccentric to the shaft A. By the side of the disk I mount a horizontal sliding bar, E, having its middle bowed or bent upward over the hub C, and having attached to it two rollers, $a$ and $b$, which bear against opposite sides of the hub, as shown in Figs. 1 and 2, the roller $a$ being above, and the roller $b$ below the axis of the disk. On the opposite outer side of the disk B I secure a semicircular flange, D, opposite to and parallel with the periphery of hub C, as shown by Figs. 1 and 3. I also mount by the outer face of the disk a horizontal sliding bar, F, provided with two rollers, $d$ and $e$, bearing against the inside of the flange D, the roller $d$ being above, and the roller $e$ below the axis of the disk. The ends of the two sliding bars E and F I connect by a head-piece, G, from which connection may be made to the device or mechanism to be operated.

When the disk B is turned, the hub C, acting between the rollers $a$ and $b$, moves the bar E back and forth, while at the same time the flange D, traveling around outside of and acting upon the rollers $d$ and $e$, moves the bar F back and forth in like manner, the two bars being thus operated simultaneously. The eccentrics and rollers being arranged as described, the reciprocating bars are given a uniform unvarying rate of speed throughout their entire movement, and a uniform steady force applied to them. As well known, these results cannot be attained by the use of a crank and pitman, as they give to the slide a varying speed, and apply a varying amount of force during each stroke. As my arrangement entirely obviates these difficulties, and is cheap and simple in construction, it will be found of great value for many purposes.

One of the principal uses to which I intend applying my contrivance is that of driving the cutters of reapers and mowers.

Having thus described my invention, what I claim is—

The combination of the shaft A having the eccentrics C and D mounted thereon, with the reciprocating slides E and F provided with the rollers $a$ $b$ and $d$ $e$, all constructed and arranged to operate as described.

REUBEN F. COCHRAN.

Witnesses:
JAMES R. FERRELL,
ABSALOM CRAMER.